Nov. 13, 1962     H. G. LIVERANCE     3,063,731
HYDRAULIC STEERING SYSTEM
Filed Sept. 2, 1960     2 Sheets-Sheet 1
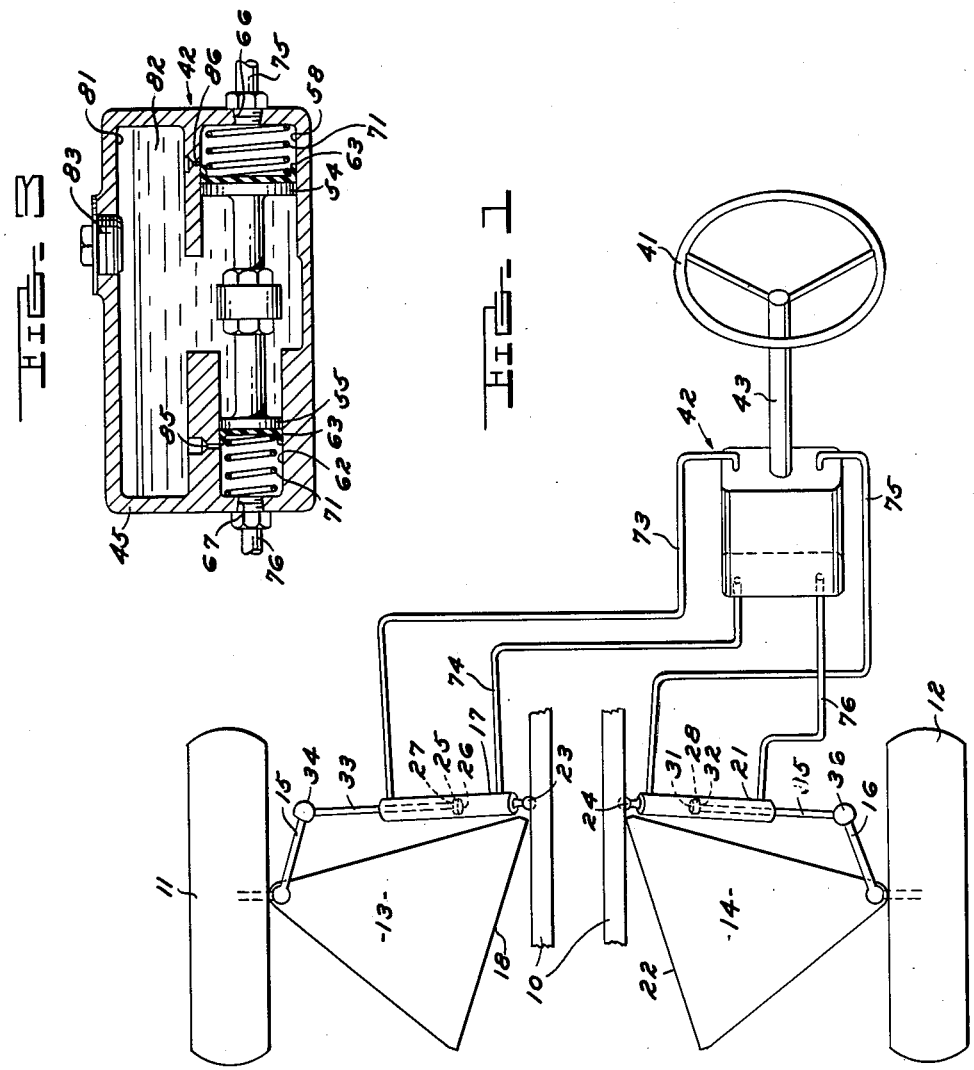
HOWARD G. LIVERANCE
INVENTOR.
BY J. R. Faulkner
K. L. Zerschling
ATTORNEYS Nov. 13, 1962  H. G. LIVERANCE  3,063,731
HYDRAULIC STEERING SYSTEM
Filed Sept. 2, 1960  2 Sheets-Sheet 2
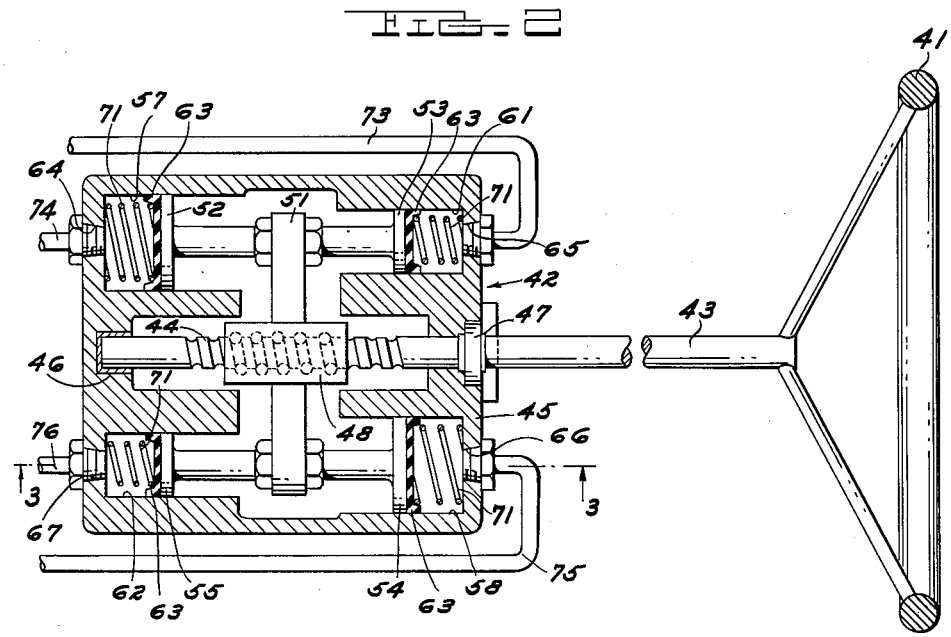
HOWARD G. LIVERANCE
INVENTOR.
BY J. R. Faulkner
K. L. Zerschling
ATTORNEYS

United States Patent Office 3,063,731
Patented Nov. 13, 1962

3,063,731
HYDRAULIC STEERING SYSTEM
Howard G. Liverance, Trenton, Mich., assignor to Ford Motor Company, Dearborn, Mich., a corporation of Delaware
Filed Sept. 2, 1960, Ser. No. 53,755
5 Claims. (Cl. 280—87)

This invention relates to an automotive vehicle steering system, and more particularly to a hydraulic steering system for an automotive vehicle that automatically aligns the steerable wheels of an automotive vehicle and that automatically centers the steering wheel of the system.

The present invention provides a manual all hydraulic steering system for an automotive vehicle in which a fluid actuator or control box is actuated by the steering wheel of an automotive vehicle. The automotive vehicle is preferably provided with a pair of power cylinders, one for each of the steerable wheels, that are operated independently by the fluid actuator, although a perfectly operative steering system may be provided using only one power cylinder. The dual system provides a high factor of safety since the vehicle may be steered through only one of the power cylinders should the other one become inoperative. It is preferred to pivotally affix the power cylinder for each wheel on the pivotal axis of a control or suspension arm of each steerable wheel, preferably a lower control or suspension arm, so that nearly the same steering geometry prevails during wheel jounce and rebound as is present during the time the wheels are in the normal position.

The fluid actuator mentioned above includes a pair of cylinders and pistons that are connected to each of the power cylinders for the steerable wheels. The cylinders and pistons of the fluid actuator have areas which are proportional to the areas of the ends of the power piston to which they are connected, thereby providing equal linear movement for both of the power pistons relative to the power cylinders.

The cylinders of the fluid actuator each have a compensating port positioned therein that communicates with a hydraulic fluid reservoir. The fluid actuator is constructed and arranged so that all of these compensating ports are open over a small selected angular travel of the steering wheel each side of the center position of the wheel. This arrangement permits each steerable wheel to find its position of neutral force, for example, with a steerable wheel having zero camber and zero scrub radius the wheels would automatically align themselves in the straight ahead position. The wheels can also be made to toe in slightly or toe out slightly by providing a selected scrub radius. This selected scrub radius may in turn be provided by different settings of kingpin inclination.

This type of arrangement also provides for constant centering adjustments of the steering wheel. If, for example, the fluid actuator is assembled with the wheels in the straight ahead position and with the steering wheel turned to the right, the compensating ports will be open during all maneuvers in the left direction. Constant bleeding of the cylinders of the fluid actuator occurs until the proper center position has been reached.

The invention also eliminates mechanical lash found in conventional steering linkages, and isolates road shocks and noise from the steering column and wheel. Additionally, the provision of the control ports as described above assists in eliminating any shimmy that may occur by providing fluid damping action as the fluid flows through the compensating ports.

An object of the present invention is the provision of a steering system for an automotive vehicle that automatically aligns the steerable wheels of the vehicle.

Another object of the invention is the provision of a steering system for an automotive vehicle which automatically centers the steering wheel of an automotive vehicle.

A further object of the invention is the provision of a steering system for an automotive vehicle that provides improved steering control during jounce and rebound of the steerable wheels of an automotive vehicle.

Still another object of the invention is the provision of a hydraulic steering system for an automotive vehicle having a high degree of safety.

Still a further object of the invention is the provision of a hydraulic steering system for an automotive vehicle that has no mechanical lash, has high mechanical efficiency, and that isolates road shocks and noise from the steering wheel.

Another object of the invention is the provision of a hydraulic steering system for an automotive vehicle that assists in eliminating shimmy of the steerable wheels of the vehicle.

Other objects and attendant advantages of the present invention will become more readily apparent as the specification is considered in connection with the attached drawings in which:

FIG. 1 is a diagrammatic top plan view of the steering system of the present invention;

FIG. 2 is a sectional view, partially in elevation, of the fluid actuator or control box and the steering wheel of the present invention, and FIG. 3 is a sectional view, partly in elevation, taken along the lines 3—3 of FIG. 2.

Referring now to the drawings in which like reference numerals designate like parts throughout the several views thereof, there is shown in FIG. 1 a pair of steerable road wheels 11 and 12 of an automotive vehicle that are suspended from the frame 10, that is partially shown, of the vehicle by a suitable suspension system including a pair of suspension or control arms 13 and 14. These suspension or control arms are pivotally mounted to the frame of the vehicle in any conventional manner. For example, the suspension or control arms may be pivotally mounted upon a shaft through a pair of bushings with the shaft in turn being affixed to the frame as shown in U.S. Patent 2,171,157. The steerable road wheels 11 and 12 have steering arms 15 and 16 connected thereto in the conventional manner. A first power cylinder 17 is pivotally mounted upon the frame of the automotive vehicle at a point along the pivotal axis 18 of the control arm 13, and a second power cylinder 21 is pivotally mounted on the frame of the vehicle along the pivotal axis 22 of the control arm 14. The cylinders 17 and 21 are preferably pivotally mounted on the vehicle frame at these points by means of ball joints 23 and 24. In conventional automotive vehicles, the steering arms 15 and 16 are located adjacent the lower control or suspension arms, therefore, it is preferable to mount the power cylinders along the pivotal axes of these arms, however, it is possible for the steering arms to be located adjacent the upper control or suspension arms and in this case it would be preferable to mount the power cylinders on the pivotal axes of the upper suspension control arms. The power cylinder 17 has a power piston 25 positioned therein that has a head end 26 and a link or rod end 27, while the power cylinder 21 has a power piston 28 positioned therein that has a head end 31 and a link or rod end 32. A link or rod 33 connects the piston 25 with the steering arm 15 through a pivotal connection 34, and a link or rod 35 connects piston 28 with the steering arm 16 through a pivotal connection 36.

The steering wheel 41 of the automotive vehicle is connected to actuate a fluid actuator or control box, generally designated by the numeral 42, through a steering shaft 43. The steering shaft 43 includes a worm 44 positioned within a housing 45 of the fluid actuator and is rotatably supported within the housing by means of suitable bearings 46 and 47 that are also constructed to take thrust loads imposed upon the worm and shaft. The worm is engaged by a suitable ball nut 48 of conventional design that has a cross member or rod 51 affixed thereto. The cross member or rod 51 has a pair of pistons 52 and 53 affixed to one end thereof and a second pair of similar pistons 54 and 55 connected to the other end thereof. Each of these pistons may be formed integrally with a shaft that is threaded at one end thereof for fastening to the end of cross member 51. The pistons 52 and 54 are positioned within cylinders 57 and 58, preferably of the same size, while the pistons 53 and 55 are positioned in cylinders 61 and 62, preferably of the same size. Each of the pistons may be provided with a hydraulic seal member, for example, a neoprene seal, designated by the numeral 63. The cylinder 57 has an opening 64 positioned in the end thereof, the cylinder 61 has an opening 65 positioned in the end thereof, the cylinder 58 has an opening 66 positioned in the end thereof, and the cylinder 62 has an opening 67 positioned in the end thereof. Biasing springs, designated by the numeral 71, are provided between the end of each of the cylinders 57, 58, 61 and 62, and the seals 63 positioned against the pistons 52, 54, 53 and 55 to provide means for biasing the pistons to the center position within the cylinders.

The chamber formed by the cylinder 61 and piston 53 is connected to the link end 27 of the power piston 25 through the opening 65 and a conduit 73, while the chamber formed by the cylinder 57 and the piston 52 is connected to the head end 26 of power piston 25 through the opening 64 and a conduit 74. The chamber formed by the cylinder 58 and piston 54 is connected to the head end of power piston 28 through the opening 66 and a conduit 75, while the chamber formed by the cylinder 62 and the piston 55 is connected to the pin end 32 of power piston 28 through the opening 67 and a conduit 76.

The fluid actuator or control box 42 is divided into an upper and a lower portion, as shown in FIG. 3. The lower portion of the fluid actuator or control box carries the pistons and the associated mechanisms discussed above, while the upper portion of the fluid motor or actuator provides a reservoir 81 for hydraulic fluid, designated by the numeral 82. A fill plug 83 may be provided in the top of the housing of the fluid actuator or control box to provide a means for filling it with hydraulic fluid.

The cylinders 57, 58, 61 and 62 are each provided with a small compensating port or orifice in the top portion thereof to connect the chambers formed between the cylinders and the pistons carried therein to the reservoir containing the hydraulic fluid. This can best be seen by reference to FIG. 3 in which an orifice or port 85 is provided to connect the chamber formed between the piston 55 and the cylinder 62 with the reservoir, while a compensating port or orifice 86 is provided to connect the chamber between the piston 54 and the cylinder 58 with the fluid reservoir.

The ratio of the area of piston 52 to the area of piston 53 is equal to the ratio of the area of the head end of power piston 25 to the area of the link end thereof and the ratio of the area of piston 54 to the area of piston 55 is equal to the ratio of the area of head end of power piston 28 to the area of the link end thereof.

If the steering wheel 41 of the present invention is rotated in a clockwise direction, the worm 44 will be rotated in a direction to move the ball nut 48 to the right, as shown in FIG. 2. This movement of the ball nut will in turn cause movement of pistons 52, 53, 54 and 55 rightwardly. This rightward movement closes the compensating ports or orifices for the pistons 53 and 54. This can be seen in relation to the piston 54 by an inspection of FIG. 3 in which it is apparent that rightward movement of the piston 54 will close the compensating port 86. Fluid from the chamber associated with the piston 53 acts to pressurize the link end 27 of power piston 25 through the conduit 73, and fluid from the chamber associated with piston 54 acts to pressurize the head end 31 of power piston 28. This action rotates the wheels 11 and 12 in a clockwise direction through the steering arms 15 and 16. This will cause a moving vehicle to turn in a rightwardly direction. It should be noted that during this maneuver, or the clockwise rotation of the steering wheel 41, that the chambers associated with pistons 52 and 55 are capable of receiving a volume of fluid that is forced from the power cylinders 17 and 21 by the head end of power piston 26 and by the link end of power piston 28 and compensating ports associated with pistons 53 and 55 are open. This can be appreciated by an inspection of FIGS. 2 and 3 in which it is apparent that the rightward movement of pistons 54 and 55 causes an increase in the volume of the chambers associated therewith and that the compensating oriffice 85 associated with piston 55 will remain open. This permits hydraulic bleeding of these two pistons to compensate for temperature differentials and to provide a constant atmospheric adjustment of the pressures involved.

If the steering wheel is rotated in the counterclockwise direction to execute a left turn, the worm 44 moves the ball nut 48 leftwardly as shown in FIG. 2, and this in turn moves all of the pistons 52, 53, 54 and 55 leftwardly. When this happens the link end 32 of the power piston 28 is pressurized by fluid under pressure from the chamber associated with piston 55 through the conduit 76 while the head end 26 of power piston 25 is pressurized by fluid under pressure from the chamber associated with piston 52 through conduit 74. This moves the wheels 11 and 12, through the steering arms 15 and 16, in a counterclockwise direction thereby providing a leftward movement of a moving vehicle. During the counterclockwise turning of the steering wheel 41 the compensating ports associated with pistons 52 and 55 are closed, and those associated with the pistons 53 and 54 remain open to provide temperature and pressure compensation as discussed above.

It can be appreciated from the above discussion and inspection of the drawings that equal linear movement of the power pistons 25 and 28 is provided since the areas of the pistons 52 and 53 and the areas of the pistons 54 and 55 of the fluid actuator are proportional to the areas of the head end and link end of the power pistons.

The steering mechanism of the present invention is constructed and arranged so that the compensating ports or orifices for all of the pistons of the fluid actuator or control box, two of which are shown in FIG. 3 at 85 and 86, are all open when the steering wheel is positioned in the center position. Also, the steering system is arranged and constructed so that all of these compensating ports or orifices are open over a selected angular travel of the steering wheel each side of this center position, for example, the steering system may be constructed so that the compensating ports are open over approximately 3° of steering wheel rotation about this center position. This permits each wheel to find its position of neutral force, for example, with a wheel having zero camber and zero scrub radius, that is a wheel in which the tire centerline and the kingpin centerline intersect at the road surface, this would be the straight ahead position. Each one of the steerable wheels 11 or 12 may initially start out with an improperly adjusted toe angle, however, by driving the vehicle on a flat surface the improper adjustment will be eliminated. Each time the steering wheel is passed through the selected angular travel in which all of the compensating ports are opened, slight adjustments are made in the volumes of hydraulic fluid enclosed within the chambers associated with the pistons 52, 53, 54 and 55. Eventually, the wheels will arrive at their proper position.

The steering system may also be arranged so that slight amounts of toe-in or toe-out may be accomplished in the same manner if desired. For example, if the steering system is arranged so that the axis of the kingpin associated with each steerable wheel 11 and 12 intersects the tire centerline at a position below the surface of the road, the wheels may assume a slight toe-out condition. If the opposite is true, however, if the kingpin axis intersects the tire centerline above the road surface, the steerable wheels 11 and 12, will assume a slight toe-in condition.

The steering system of this invention also provides constant centering adjustments of the steering wheel so that the wheel will automatically assume a centered position when the steerable wheels are pointed in the straight ahead position, for example, if the fluid actuator or control box 42 is assemblied with the wheels in the straight ahead position, and with the steering wheel turned to the right, the compensating ports will be open during all maneuvers, in the left direction. This permits constant bleeding of the chambers associated with the pistons to occur through the compensating ports or orifices until the proper center position has been reached.

As noted previously, the power cylinders 17 and 21 are affixed to the vehicle by means of some suitable pivotal attachment, such as ball joints 23 and 24, along the axes 18 and 22 of the control arms 13 and 14. It can be appreciated that this permits good steering control since the position of the steering arms 15 and 16 will not change appreciably during the jounce and rebound of the steerable wheels 11 and 12. This is true since the power cylinders and pistons are pivoted along the same axes as the control or suspension arms and wheels and will follow the movement of the suspension or control arms and wheels during jounce and rebound. The provision of the control ports or orifices for all the pistons 52 through 55, also assists in eliminating any tendency for the steerable wheels 11 and 12 to shimmy, since the orifices provide a damping action for hydraulic fluid that may traverse these orifices during the shimmy condition.

This steering system may also provide a high factor of safety since two power cylinders may be employed, one for each wheel, and in case of failure of the hydraulic system or the linkage mechanism associated with one power cylinder and piston, the other power cylinder and piston is capable of steering the automobile. Furthermore, the fluid actuator or control box 42 may be attached to the sheet metal body of the automotive vehicle rather than to the frame thereof as in conventional steering systems. Thus, in case of front end collisions the steering wheel is less apt to injure the operator of the vehicle.

The invention also provides the advantage of isolating road shocks and noise from the steering wheel 41. This is accomplished through the damping action of the hydraulic system employed. Similarly, by employing a hydraulic system, mechanical lash is eliminated and improved mechanical efficiency is obtained.

The present invention thus provides a steering system for an automotive vehicle that automatically aligns the steerable wheels of the vehicle and provides for automotive steering wheel centering. It further provides a steering system having numerous advantages over prior art mechanisms as pointed out in the preceding description.

It will be understood that the invention is not to be limited to the exact construction shown and described, but that various changes and modifications may be made without departing from the spirit and scope of the invention as defined in the appended claims.

I claim:

1. A hydraulic steering system for an automotive vehicle comprising, a steerable road wheel suspended from said automotive vehicle, a power cylinder member and a power piston member, one of said members being affixed to the automotive vehicle and the other of said members being connected to said steerable road wheel, a fluid actuator hydraulically coupled to said power cylinder member and said power piston member, a steering wheel connected to said fluid actuator, said fluid actuator having a reservoir, and means in said fluid actuator for hydraulically connecting both sides of said power piston member to the reservoir over a selected angular travel of the steering wheel each side of the center position of said wheel.

2. A hydraulic steering system for an automotive vehicle comprising, a steerable road wheel suspended from said automotive vehicle, a power cylinder member, a power piston member positioned within said power cylinder member and being relatively reciprocable therewith, said power piston having a head end and a rod end, means connecting one of said members to said automotive vehicle, means connecting the other of said members to said steerable wheel, a fluid actuator, said fluid actuator including a first piston hydraulically coupled to the rod end of said piston and a second piston connected for movement with said first piston and hydraulically coupled to the head end of said power piston, said first and second pistons having a zero position, a steering wheel having a center position, said steering wheel connected to said first and said second pistons of said fluid actuator for moving said first and second pistons from said zero position when said steering wheel is moved from said center position, said fluid actuator having a reservoir, and a porting means associated with each of said pistons of said fluid actuator for simultaneously connecting the head end and the rod end of said power piston to the reservoir when said first and second pistons are in said zero position and over a selected angular travel of the steering wheel each side of said center position of the wheel.

3. A hydraulic steering system for an automotive vehicle having a frame, a manually operable steering wheel and a steerable road wheel, comprising relatively reciprocable cylinder and piston members, means connecting one of said members to said frame, means connecting the other of said members to said steerable road wheel, a fluid actuator, a reservoir of hydraulic fluid connected to said fluid actuator, said fluid actuator including moveable means connected to be operated by said steering wheel and simultaneously hydraulically connecting each side of said power piston member to said reservoir over a selected angular interval of travel of the steering wheel each side of the center position of said steering wheel, and said moveable means connecting only one side of said power piston to said reservoir when said steering wheel travels beyond said selected angular interval from said center position.

4. A hydraulic steering system for an automotive vehicle having a frame, a manually operable steering wheel and a pair of steerable road wheels, comprising a first pair of relatively reciprocable power cylinder and power piston members, means connecting one of said members to said frame, means connecting the other of said members to one of said steerable road wheels, a second pair of relatively reciprocable power cylinder and power piston members, means connecting one of said members to said frame, and the other of said members to the other one of said steerable road wheels, a fluid actuator, a reservoir of hydraulic fluid connected to said fluid actuator, said fluid actuator including moveable means connected to said manually operable steering wheel for simultaneously hydraulically connecting each side of both power piston members to said reservoir over a selected angular travel of the steering wheel each side of the center position of said steering wheel, and said moveable means connecting only one side of both of said power piston members to said reservoir when said steering wheel travels beyond said selected angular travel from said center position.

5. A hydraulic steering system for an automotive vehicle comprising, a steerable road wheel suspended from said automotive vehicle, a power cylinder member and a power piston member, one of said members being affixed to the automotive vehicle and the other of said members being connected to said steerable road wheel, a fluid actuator, said fluid actuator having a reservoir with a zero position and being hydraulically connectable to said power cylinder, and said fluid actuator having moveable means for hydraulically connecting said reservoir to said power piston when said moveable means is within a given distance from said zero position, a steering wheel connected to said moveable means of said fluid actuator, whereby actuation of said steering wheel moving said moveable means of said fluid actuator beyond said given distance from said zero position will cause said steerable wheel to move in accordance with the movement of said steering wheel while movement of said steering wheel which does not move said moveable means beyond said given distance will not cause movement of said steerable wheel.

References Cited in the file of this patent

UNITED STATES PATENTS

| | | |
|---|---|---|
| 1,953,742 | Bunch et al. | Apr. 3, 1934 |
| 2,555,649 | Krotz | June 5, 1951 |
| 2,654,265 | Nallinger | Oct. 6, 1953 |

FOREIGN PATENTS

| | | |
|---|---|---|
| 839,712 | France | Apr. 11, 1939 |